Oct. 23, 1934.   J. H. TAYLOR   1,978,178
WELDING LUG
Filed May 9, 1932
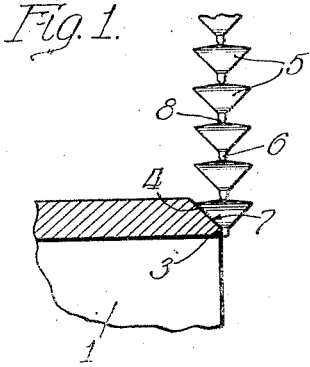
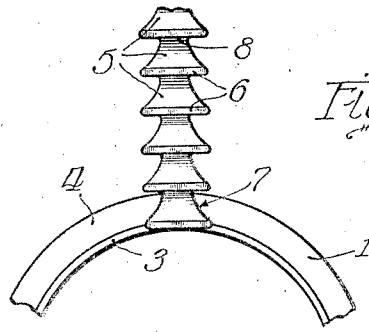
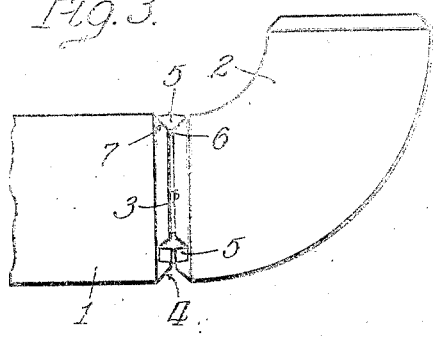
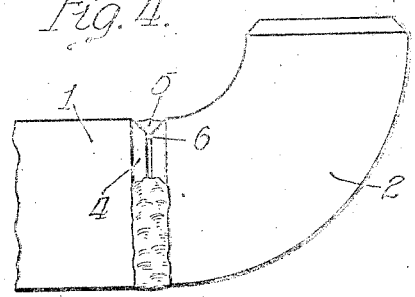
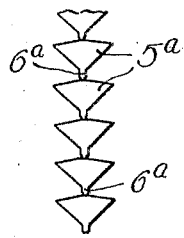
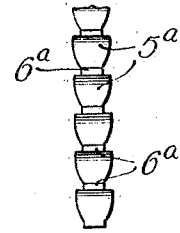
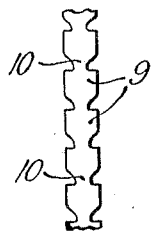
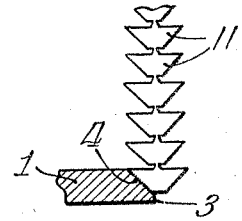
Inventor:
James Hall Taylor
By: Brown, Jackson, Boettcher & Dienner,
Attys.

Patented Oct. 23, 1934

1,978,178

UNITED STATES PATENT OFFICE 1,978,178

WELDING LUG

James Hall Taylor, Oak Park, Ill.

Application May 9, 1932, Serial No. 610,282

3 Claims. (Cl. 219—8)

This invention relates to welding, and has to do more particularly with means for centering the ends of pipes and analogous tubular articles in juxtaposed and centered relation for welding.

It is known to provide pipe fittings having lugs extending from the ends thereof so as to project over the outer surface of pipe ends, the lugs providing means for centering the fittings and the pipe ends and for temporarily welding them together preliminary to the welding operation by which the fittings and the pipe ends are permanently secured together. Fittings of this character are open to the objection that the lugs, being disposed beyond the outer face of the fittings and projecting beyond the end thereof, are apt to be damaged or broken off in shipment and handling of the fittings. A further objection to this type of fitting is that the lugs form objectionable projections beyond the outer face of the fitting which interfere, to a certain extent, with the welding operation. The provision of lugs formed integrally with the fitting is also objectionable in that, if two of such fittings are to be welded together, the lugs may, in frequent instances, prevent or interfere with positioning of the fittings in proper angular relation.

One of the main objects of my invention is to provide means whereby welding lugs may be secured to the end of a pipe or analogous tubular article in any desired relation, as conditions may require, and with facility. A further object of my invention is to provide a plurality of lugs connected together in the form of a stick which facilitates positioning of the end lug of the series or stick during welding of such lug to the pipe end. Further objects and advantages of my invention will appear from the detail description.

In the drawing:—

Figure 1 is a side view of a stick of lugs in accordance with my invention, illustrating the method of applying the end lug of the stick to a pipe end which is shown fragmentarily and in section;

Figure 2 is a front view of the stick of lugs and the pipe end of Figure 1;

Figure 3 is an elevation of a pipe end and a fitting secured together in juxtaposed and centered relation by means of the lugs of my invention;

Figure 4 is a view similar to Figure 3, but showing the fitting and the pipe end part welded together;

Figure 5 is a side view of a stick of lugs illustrating a modified form of lug;

Figure 6 is a front view of the stick of lugs of Figure 5;

Figure 7 is a detail of a strip or bar from which the lugs of Figures 5 and 6 are produced;

Figure 8 is a view similar to Figure 1, but illustrating a second modified form of lug.

The lugs of my invention are particularly adapted for use with a pipe 1 which is to be welded to another pipe or to a fitting 2. The end of the pipe is suitably shaped to provide an inner and relatively narrow straight portion 3 disposed substantially normal to the pipe, and an outer beveled portion 4 extending from straight portion 3 to the outer surface of the pipe. The adjacent end of the fitting 2, or another pipe, as the case may be, is shaped in the same manner as the end of pipe 1. To facilitate welding together of the ends of the pipes, or the pipe and the fitting, it is desirable that the ends to be welded together be preliminarily secured together in juxtaposed and centered relation. To facilitate positioning and the preliminary securing together of the ends of the pipe and the fitting, I provide a plurality of welding lugs in the form of a stick by means of which the lugs may be welded with facility to the pipe end in selected positions thereon.

Referring more particularly to Figures 1 and 2, I provide a plurality of lugs 5 of approximately V-shape, each lug being provided, at its vertex, with a depending element 6 which is integrally united with the body portion of the next lower lug, preferably centrally thereof. The element 6 is much thinner than the body portion of the associated lug, and in practice may be approximately $\frac{1}{32}$ of an inch in thickness, though this may be varied within limits to suit conditions. The opposite surfaces of the lugs are inclined at the same angle as beveled surface 4 of the pipe end so as to seat accurately thereupon. In applying the lugs to the pipe end, the end lug of the stick is seated upon beveled surface 4, with element 6 extending across and in contact with straight portion or surface 3 of the pipe end, which facilitates accurately positioning the lug upon the pipe end. After the lug has been thus positioned, it is suitably welded to the pipe end, as at 7, the remaining lugs of the stick or series providing convenient means for holding the end lug in position during welding thereof to the pipe end. After this lug has been welded to the pipe end, the remaining lugs of the stick are separated from the welded lug by severing or breaking element 6 of the lug next to the welded lug from the latter. This next lug is then welded to the pipe end in the same manner, in suitable position, this operation being repeated until the desired number of lugs are properly positioned upon the pipe end. In practice, three lugs are sufficient under ordinary conditions. By providing the lugs in the form of a series or stick, positioning and welding of the lugs in selected locations upon the pipe end is greatly facilitated.

After the desired number of lugs have been secured upon the pipe end, fitting 2 is disposed with the end thereof in contact with the lugs, which serve to center the end of the fitting relative to the end of the pipe. When the fitting is thus disposed, elements 6 of the lug extend between the end of the fitting and the pipe and serve as spacing elements. The lugs 5 are then welded to the end of the fitting 2, thus temporarily securing the fitting to the pipe end in proper relation thereto for welding. With the fitting thus disposed, the adjacent beveled ends of the pipe and the fitting define a trough-like depression which facilitates the welding operation. The fitting and the pipe end are then welded together, as in Figure 4. During the welding operation, the end of the pipe and the end of the fitting expand, due to the heat incident to welding, and pinch off the spacing elements 6. The lugs 5 are melted during the welding operation and become integral parts of the weld. By having the lugs formed in a stick, it is possible for an experienced welder to apply quickly the lugs to the pipe end in desired positions thereon and with facility, it being noted that the lugs are disposed inwardly of the outer circumference of the pipe so as to avoid interference with the welding operation. Securing the lugs to the pipe end in desired positions thereon has the advantage that these lugs may be disposed to suit requirements, and also avoids possibility of breakage of the lugs such as occurs in fittings of the character above referred to having lugs formed integrally therewith.

The series or stick of lugs of my invention can be produced readily and at small cost by forging or otherwise forming a strip or bar of metal of proper dimensions. Conveniently, the wider or base portion of each lug 5 may be inclined upwardly from its opposite edges so as to produce a thinning of metal, as at 8, at the juncture between element 6 and the next adjacent lug. This facilitates separation of the lugs, which may be accomplished by bending the stick, above the lug which has been welded to the pipe end, in such manner as to impart a to and fro movement to the stick. This thinning of the metal is not essential, however, since the element 6 can readily be separated from the next adjacent lug, either by bending or by severing such element by a suitable tool.

I contemplate forging the stick of lugs of Figures 1 and 2 from a metal bar or rod initially of uniform cross section. Since the elements 6 are much thinner than the lugs 5, these elements are of greater length than the lugs, the lateral surfaces of which may flare downwardly to a certain extent, as in Figure 2. Under certain conditions, these relatively long spacing elements 6 may interfere to an objectionable degree with the expansion of the ends of the pipe and the fitting, or the pipe ends, as the case may be, during the welding operation. I contemplate, therefore, the provision of lugs having associated therewith spacing elements of less length than the lugs. In Figures 5 and 6 I have shown a stick of lugs 5a connected together by spacing elements 6a of appreciably less length than the lugs. This stick of lugs may be produced from a bar or rod 9 which, preliminary to final forging or shaping thereof, is pressed in or notched to form restrictions 10 corresponding in spacing to the spacing of elements 6a to be formed. This bar, thus preliminarily formed, is then suitably shaped, preferably by forging, to form the lugs 5a connected together by the relatively short spacing elements 6a. These lugs are used in the same manner as the lugs of the stick shown in Figures 1 and 2.

In Figure 8 I have illustrated a further modified form of lug 11, this lug being of approximately V-shape, and the lugs of the stick being secured directly together and without an intervening spacing element. When using the lugs 11, the end lug of the stick is welded in position upon the beveled surface 4 of the end of pipe 1, but, in this case, the upper or outer face of the lug is disposed flush with the outer face of the pipe. This facilitates positioning of the lugs upon the pipe end. The inclined opposite surfaces of the lug are disposed at the same angle as the inclined surfaces of the pipe end and the fitting 2 so that these lugs act to both center and space the ends of the pipe and the fitting, or of the pipes, as the case may be, in substantially the same manner as in Figure 3. Since lugs 11 are used in the same manner as lugs 5, further description of the method of positioning and welding together the ends of the pipe and the fitting, by means of lugs 11, is not necessary.

While the lugs of my invention are particularly adapted for use in welding together pipe ends and analogous tubular articles, they are in no way restricted to this one use, since they are capable of being used for many other purposes. My invention comprehends, in its broader aspects, a plurality or series of lugs suitably secured together so as to provide, in effect, a stick or handle element for positioning and holding the end lug of the series during welding thereof to an article, the lugs being adapted for ready separation.

What I claim is:—

1. As a new article of manufacture, a welding stick comprising a plurality of metal lugs adapted to be welded individually to articles to be welded together, said lugs being of approximately V-shape and disposed one above the other with the vertex of each of the respective lugs integrally united to the body portion of the next adjacent lug whereby the metal of union between the successive lugs is materially reduced in thickness to facilitate separation of the lugs.

2. As a new article of manufacture, a welding stick comprising a plurality of metal lugs of approximately V-shape disposed in alignment one above the other, each of the respective lugs being provided at its vertex with a relatively thin element integrally united to the body portion of the next adjacent lug.

3. As a new article of manufacture, a welding stick comprising a plurality of metal lugs of approximately V-shape disposed in alignment one above the other, each of the respective lugs being provided at its vertex with a relatively thin spacing element of predetermined thickness and height integrally united to the body portion of the next adjacent lug.

JAMES HALL TAYLOR.